Sept. 14, 1937. J. E. KERMODE 2,092,848
AUTOMATIC NONWASTE PIGEON FEEDER
Filed April 3, 1937
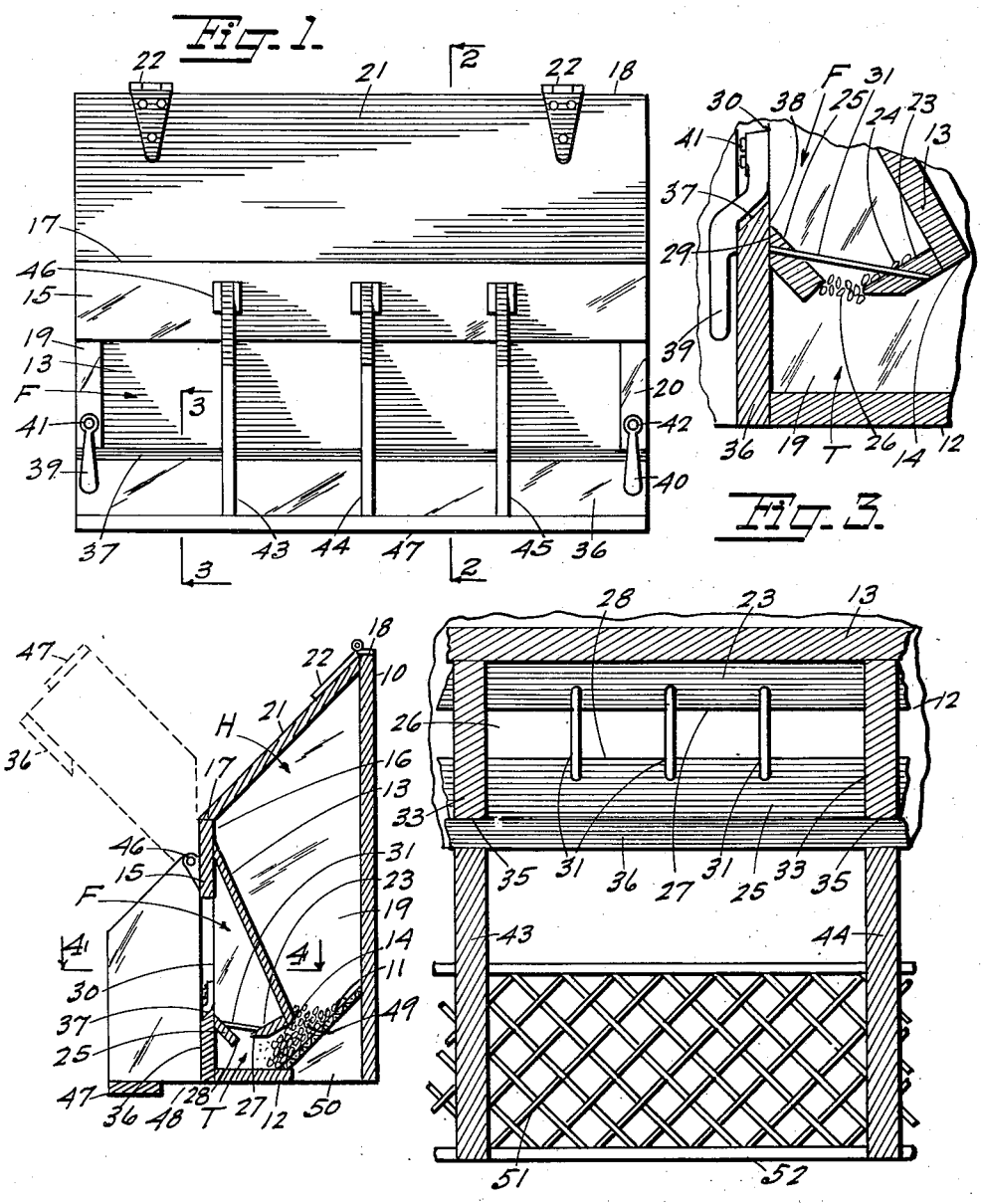

Patented Sept. 14, 1937

2,092,848

UNITED STATES PATENT OFFICE 2,092,848

AUTOMATIC NONWASTE PIGEON FEEDER

James E. Kermode, Hayward, Calif.

Application April 3, 1937, Serial No. 134,958

5 Claims. (Cl. 119—52)

This feeder may be made in various sizes to accommodate birds of various sizes, such as canaries and other small birds and chicks, pigeons and other medium sized birds, and chickens and other larger birds, and is primarily designed for pigeon feeding.

The feeder may be constructed of any suitable material, such as wood or sheet metal, and is shown as formed of wood, and is shown with four stalls or compartments, which number may be varied from one to any number within the capacity of the space within which it is to be located, or to accommodate any number of birds which are to be served.

The objects of the invention are as follows:

First; to provide a bird feeder which may be built in various sizes to accommodate different sizes and types of birds.

Second; to provide a bird feeder which may be divided into a series of stalls or compartments to prevent crowding between birds during the feeding period.

Third; to provide a bird feeder which can be conveniently cleaned through the provision of a removable front wall for the feed trough.

Fourth; to provide a feeder of the type outlined with an inclined screen bottom for the hopper for gravitationally screening the feed as it passes from the hopper to the trough, so as to provide a clean feed for the birds.

Fifth; to form a stall unit in which the front wall of the trough, the stall partitions, and the perch constitute a unit, which unit is removable to facilitate cleaning of the trough, at will.

Sixth; to provide hinge means for the stall unit, whereby the unit may be swung out of the way for cleaning the trough, and to provide means for locking the stall unit in its normal position in which the front wall of the trough is secured in position to retain feed in the trough.

Seventh; to provide a feed trough with a scatterproof top structure, which is divided into stall compartments which in turn are subdivided into a plurality of feeder sections of sufficient width to permit convenient feeding while being sufficiently narrow to prevent scattering and throwing of feed by birds.

Eighth; to form the trough top structure with a front member rearwardly and downwardly inclined, and a rear member forwardly and downwardly inclined and forming a feed slot between the adjacent edges, with spaced sub-dividing members secured in the higher portions of and spanning the members and being rearwardly and downwardly inclined to form the highest obstruction toward the front, the front and rear members gravitationally returning feed to the slot.

Other objects and advantages of the invention will become apparent as the following description is read on the drawing forming a part of this specification, and in which similar reference characters are used to designate similar parts throughout the several views, of which:

Fig. 1 is a front elevation of the invention.

Fig. 2 is a section taken on line 2—2 of Fig. 1.

Fig. 3 is an enlarged fragmentary section taken on line 3—3 of Fig. 1.

Fig. 4 is an enlarged fragmentary section taken on line 4—4 of Fig. 2, with the perch modified as formed of wire mesh.

The feeder hopper H has a rear wall 10, an inclined screen bottom 11 which is forwardly and downwardly inclined at an angle greater than the angle of repose of the material used for feed, and which connects with the bottom 12 of the feeder, and an inclined front wall 13 which terminates in spaced relation to the bottom 12 and to the screen 11, as shown at 14.

An upper front panel for the feeder, indicated at 15, forms the upper portion 16 of the hopper and coincidently forms a support for the stall unit, the top 17 of this panel terminating in a plane below the top 18 of the rear wall.

The end walls 19 and 20 coincidently form end walls for the hopper compartment H, trough compartment T, and feeder compartment F, and a sloping cover 21 is hinged to the rear wall 10 by hinges 22, forming a rain and dust shedding cover for the hopper.

The trough compartment consists of the bottom 12, and a top structure including a rear member 23 which is sloped forwardly and downwardly at an angle of about 30°, or about 5° less than the angle of repose of the material to be fed, to provide a reject surface which will reject all feed except a possible thin layer which may be scattered thereon by birds and return it to the slot, and a front member 25 which is sloped rearwardly and downwardly at an angle of about 45°, or at an angle greater than the angle of repose of the material, to readily and completely reject all feed scattered thereon by birds and return it to the slot 26 formed between the adjacent edges 27 and 28 of the respective members 23 and 25, these members extending throughout the length of the feeder and being attached to the end walls 19 and 20, the front edge of the member 25 being formed parallel to the front edge 30 of the end panels 19 and 20, as shown at 29.

The trough section top structure is subdivided into a plurality of compartments for each stall section as shown in Fig. 4, by means of wires or spikes 31 which form obstructions or stops, and which are located above the slot 26 and are rearwardly and downwardly inclined to provide the highest obstruction at the forward end and induce feeding toward the rear, these stops spanning the slot and being secured in the higher portions of the members 23 and 25. By this means, throwing and scattering of feed by birds is practically eliminated.

The feeder section F is divided into a plurality of compartments by means of the partitions 33 which have their front edges 35 in the same plane as the front edges 30 of the end members 19 and 20, and coincidently form at their bottom ends, intermediate supports for the members 23 and 25, and are supported by the front wall 13 of the hopper.

The front wall 36 of the feed trough T is formed integral with, or attached to the stall unit, and has a top beveled edge 37, and the inner surface of this front wall or panel extends above the highest point 38 of the member 25, and is secured in position to form the front panel of the trough section by means of suitable latches or clamps 39 and 40, which are pivotally secured to the respective end members 19 and 20 as indicated at 41 and 42.

The stall walls, partitions or members 43, 44 and 45 are aligned with the feeder partitions 33, and are hingedly supported on the upper front panel 15 by means of hinges 46, and have the trough front panel 36 attached to the lower portion of the rear edges, and have a perch 47 attached to the frontal portion of the bottom edges as shown, leaving a space 48 between the rear edge of the perch and front trough panel 36 for disposal of dirt and droppings.

The perch is preferably formed of coarse screen as shown at 51 in Fig. 4 to prevent accumulation of refuse thereon, a metal or other material frame 52 being provided for support of the screen.

The feed 49 is placed in the hopper H and feeds to the trough compartment to replace that eaten, passing over the surface of the screen 11 where dirt, dust, and refuse are screened out and discharged through the opening 50 in the bottom of the feeder, the cleaned feed passing under the edge 14 of the front wall of the hopper and being exposed between the edges 27 and 28 of the inclined members 23 and 25.

In the event that a bird attempts to scatter or throw feed while feeding, it is prevented from doing so by the obstructions or stops 31 against which it will strike its head or bill, and if any food is thrown forward, it will roll back down the inclined member 25 into the slot, and any thrown backward will deposit on the rear member 23 and all in excess of a thin layer will return to the slot, and that in the thin layer may be picked up by the bird.

When it is desired to clean the feed trough, the clamps 39 and 40 are swung outwardly and the stall unit may then be swung up to the dotted position shown in Fig. 2, which leaves the front of the trough, between the member 25 and the floor 12 open, and the entire floor 12 may then be conveniently cleaned with a brush, scraper, or by the hands.

Thus, an automatic feed screening, self-feeding trough with non-scattering and no waste features is provided, together with screenings disposal, and non-crowding perches removable with the front panel of the trough for easy and convenient cleaning of the trough.

As will readily be understood, this feeder may be constructed of either wood or sheet metal, and is now built in both types in accordance with personal preferences, and variations in construction and arrangement of parts, which variations are consistent with the appended claims, may be resorted to, without detracting from the spirit or scope of the invention or sacrificing any of the advantages thereof.

I claim:

1. A pigeon feeder comprising, a feed hopper and a feed trough intercommunicating, and screening means forming the bottom for the hopper and screening feed as it passes from the hopper to the trough and discarding the screenings from the feed, and a stall unit comprising a plurality of spaced partitions, a perch connecting the bottoms of said partitions, a front wall for said trough connecting said partitions, said partitions being hinged to said feeder for swinging said stall unit including said front wall of said trough into nonobstructional relation to the trough for convenient cleaning of the floor of the trough.

2. A pigeon feeder, in combination, a feed hopper and a feed trough in intercommunication, inclined screening means forming the bottom of the hopper and directing feed to the trough and screening the feed previous to delivery to the trough and discarding the screenings therethrough; a top structure for said trough comprising inclined feed reject means with interposed feed slot, said reject means returning scattered feed gravitationally to said slot; head movement limiting means spanning said slot in spaced relation and located above said slot and preventing throwing of feed during feeding, and a stall unit comprising a plurality of spaced partitions, a perch connecting the bottoms of said partitions, a front wall for said trough connecting said partitions and being of equal length to said trough, said partitions being hinged to said feeder for swinging said stall unit including said front wall into non-obstructional relation to said trough for convenient cleaning of the floor of said trough.

3. In a pigeon feeder, a feed hopper, a feed trough in communication with said feed hopper, a feeder section having a plurality of partitions forming a series of feeder compartments in communication with said feed trough, a screen for screening and cleaning feed as it passes from said hopper to said trough and forming the bottom of said hopper and being inclined downwardly to the point of communication with said trough, whereby all feed passes thereover previous to delivery to said trough, said screen discharging screenings directly from said feeder, a top structure for said trough comprising two oppositely inclined covering elements discharging feed back into a feed slot formed therebetween, and a series of spaced apart obstruction elements for each compartment and spanning said slot and located thereabove to obstruct throwing of feed during feeding.

4. In a pigeon feeder, a feed hopper, a feed trough in communication with said feed hopper, a feeder section having a plurality of partitions forming a series of feeder compartments in communication with said feed trough, a screen for screening and cleaning feed as it passes from said hopper to said trough and forming the bottom of said hopper and being inclined downwardly to the point of communication with said trough, whereby all feed passes thereover previous to delivery to said trough, said screen discharging screenings directly from said feeder, a stall unit hinged to said feeder and consisting of a wall aligning with each partition, and a hinge connecting the upper end of each wall to said feeder, a front wall for said trough attached to the lower portion of the inner ends of said walls, and a perch supported at the lower ends of said walls, whereby said stall unit with the front wall of said trough may be swung away from said trough at will for cleaning of the floor of the feeder, and latch means for securing said stall unit, with the front wall of the trough in its normal feed-retaining position on the trough.

5. In a bird feeder, a feed trough having a non-waste cover element consisting of two oppositely inclined members spaced apart to form a feed slot therebetween and gravitationally discharging scattered feed back into said slot, said members consisting of a front member and a rear member, said front member having an angle of inclination greater than the angle of repose of bird feed and said rear member having an inclination less than the angle of repose of said feed, whereby all feed is returned to the slot by the front member, and only a thin layer of feed may accumulate on said rear member.

JAMES E. KERMODE.